(12) United States Patent
Sauder et al.

(10) Patent No.: US 10,517,204 B2
(45) Date of Patent: *Dec. 31, 2019

(54) IMPLEMENT WEIGHT MANAGEMENT SYSTEMS, METHODS, AND APPARATUS

(71) Applicant: Precision Planting LLC, Tremont, IL (US)

(72) Inventors: Derek Sauder, Tremont, IL (US); Jason Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/798,165

(22) Filed: Oct. 30, 2017

(65) Prior Publication Data

US 2018/0042168 A1 Feb. 15, 2018

Related U.S. Application Data

(63) Continuation of application No. 15/033,989, filed as application No. PCT/US2014/064704 on Nov. 8, 2014, now Pat. No. 9,801,322.

(60) Provisional application No. 61/901,929, filed on Nov. 8, 2013.

(51) Int. Cl.
*A01B 63/11* (2006.01)
*A01B 73/02* (2006.01)
*A01B 73/06* (2006.01)
*A01C 7/20* (2006.01)

(52) U.S. Cl.
CPC ............ *A01B 63/11* (2013.01); *A01B 73/065* (2013.01); *A01C 7/203* (2013.01)

(58) Field of Classification Search
CPC ........... A01B 3/24; A01B 63/10; A01B 63/11; A01B 59/002; A01B 73/044; A01B 73/048; A01B 73/065; A01B 79/005; A01B 73/02; A01C 7/04; A01C 7/105; A01C 7/203; A01C 7/205; A01C 7/208; A01C 14/00; B60Q 1/26; G06Q 40/12; G06Q 99/00; Y10S 111/90
USPC ....... 111/104, 170, 200; 172/1–11, 311, 459, 172/663; 701/1, 50; 705/1.1, 400, 500
See application file for complete search history.

(56) References Cited

U.S. PATENT DOCUMENTS 6,779,469 B1  8/2004  Weaver
8,386,137 B2  2/2013  Sauder et al.
(Continued)

FOREIGN PATENT DOCUMENTS

WO  2012167258 A1  12/2012
WO  2013022835 A1  2/2013
WO  2013112929 A2  8/2013

OTHER PUBLICATIONS

Ukraine Office Action from Ukraine Patent Office for UA Application No: 201606160, dated Jan. 3, 2019, 6 pages.

(Continued)

*Primary Examiner* — Robert E Pezzuto

(57) ABSTRACT

Systems, methods and apparatus are provided for managing implement weight. In some embodiments, a position sensor is used to determine a position of the wing section and a downforce applied to the wing is modified in order to lower the wing section. In some embodiments, the position sensor indicates the position of a wing wheel assembly of the wing section. In other embodiments, the position sensor indicates the position of a center wheel assembly of a center section of the implement.

18 Claims, 13 Drawing Sheets

(56) References Cited

U.S. PATENT DOCUMENTS

2012/0036914 A1  2/2012  Landphair et al.
2013/0081828 A1  4/2013  Tuttle et al.

OTHER PUBLICATIONS

Extended European Search Report from the European Patent Office for EP Application No. 14860202.2, dated Nov. 21, 2018, 7 pages.
Written Opinion and International Search Report, dated Feb. 23, 2015, pp. 1-16.
Australia Examination Report, dated Jul. 20, 2017, pp. 1-4.

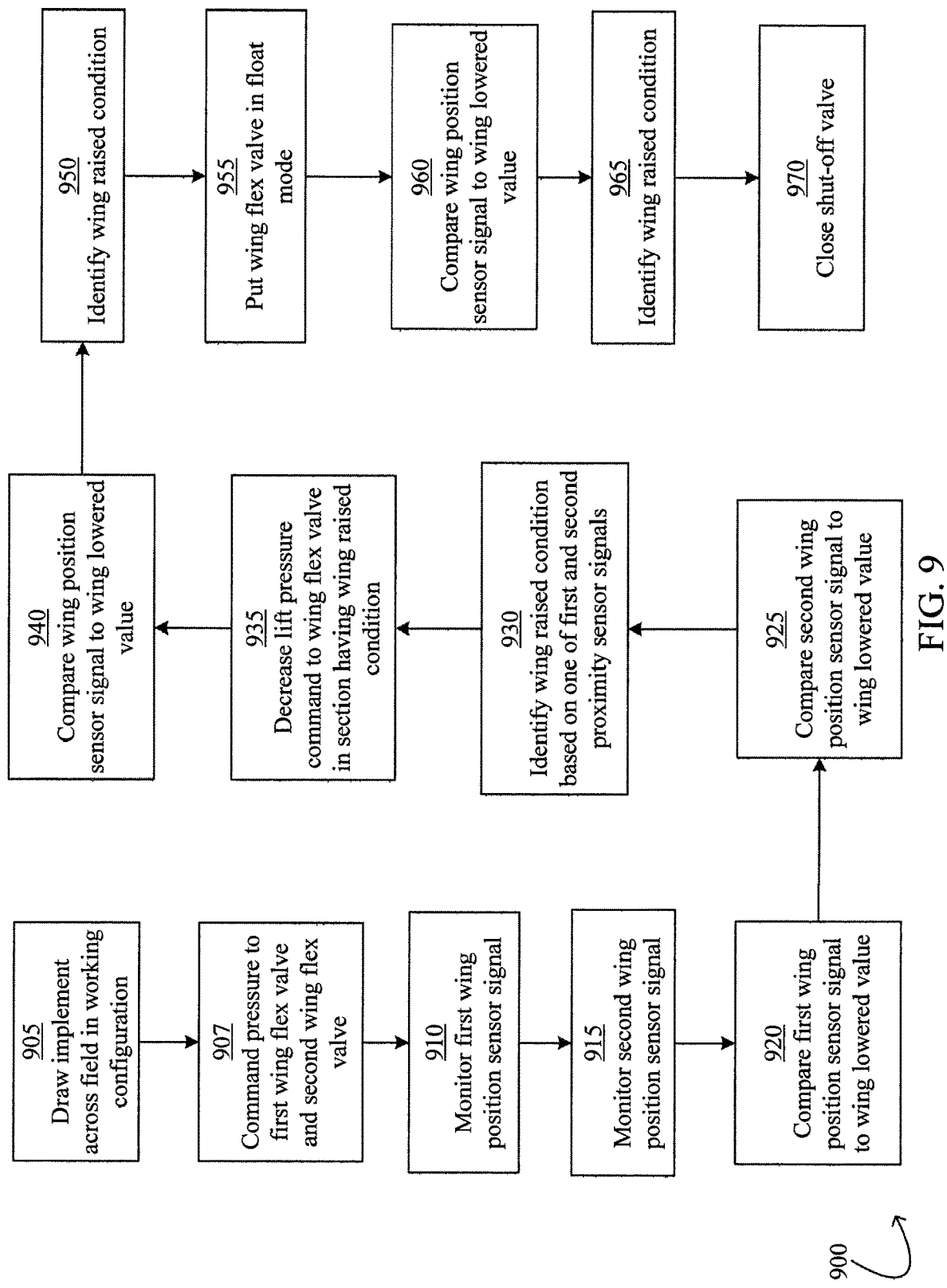

IMPLEMENT WEIGHT MANAGEMENT SYSTEMS, METHODS, AND APPARATUS

BACKGROUND

In recent years, agronomic studies have increased interest in ensuring proper weight management on agricultural implements, particularly during the planting pass. Transferring weight between components of a large implement entails safety hazards and risk of damaging the implement or tractor.

Thus there is a need in the art for improved systems, methods and apparatus for implement weight management. There is a particular need in the art for such systems, methods and apparatus offering improved safety during operation.

BRIEF DESCRIPTION OF THE DRAWINGS

FIG. 9 illustrates an embodiment of a weight transfer shutoff process.

DESCRIPTION

Implement Embodiments

Figure 1:
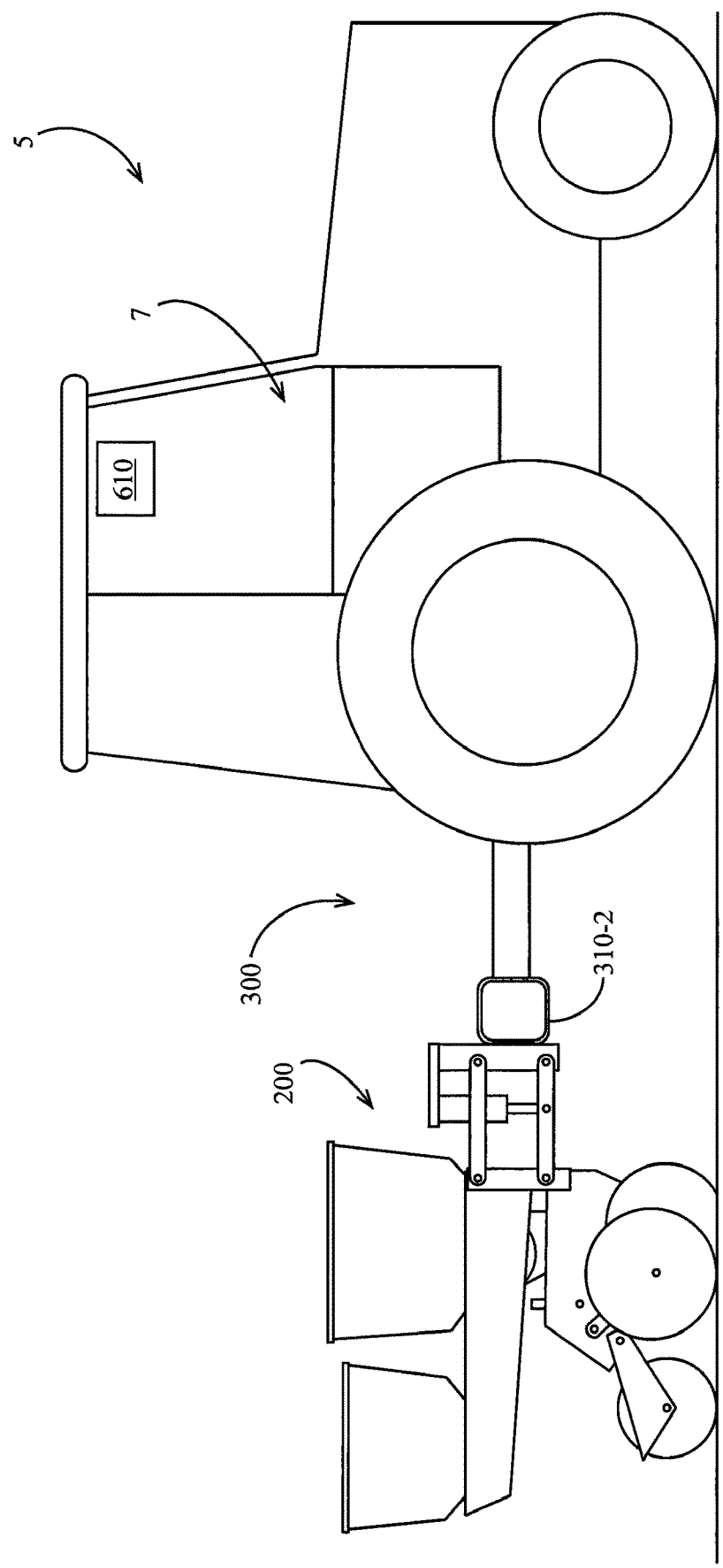
FIG. 1 is a side elevation view of a tractor drawing an embodiment of a planter.

Referring now to the drawings, wherein like reference numerals designate identical or corresponding parts throughout the several views, FIG. 1 illustrates a planter 300 being drawn by a tractor 5. The planter 300 includes a transversely extending toolbar to which multiple row units 200 are mounted in transversely spaced relation.

Figure 3:
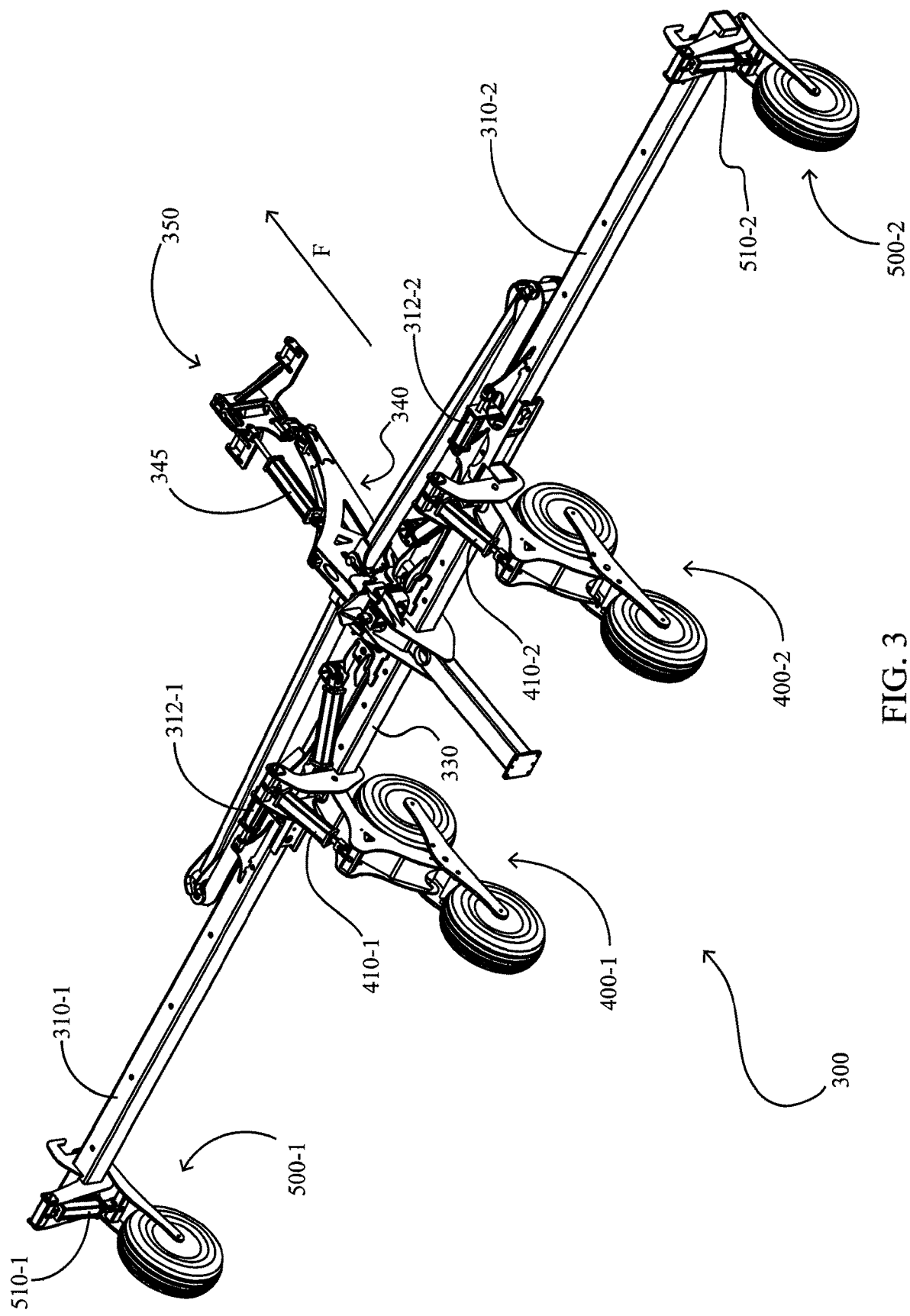
FIG. 3 is a rear perspective view of the planter of FIG. 1 with the row units not shown for illustrative purposes.

Referring to FIG. 3, the planter 300 is coupled to the tractor 5 by a hitch assembly 350 and thereby drawn in the planting direction indicated by arrow F. The hitch assembly 350 is coupled to a weight transfer assembly 340. The weight transfer assembly 340 preferably includes a hitch actuator 345; the hitch actuator 345 preferably comprises a dual-acting hydraulic cylinder and is preferably disposed to transfer a vertical load from the tractor to the planter or from the planter to the tractor.

The transversely extending toolbar of the planter 300 preferably includes a left wing section 310-1, a center section 330, and a right wing section 310-2. A plurality of row units 200 (not shown in FIG. 3) are preferably mounted to each section of the toolbar. The left wing section 310-1 is preferably pivotally coupled to the center section 330 (either directly or via intermediate structure) for relative motion about a substantially horizontal axis parallel to the planting direction. A left wing flex actuator 312-1 (preferably a dual-acting hydraulic cylinder) is preferably pivotally coupled to the left wing section 310-1 and the center section 330. The left wing flex actuator 312-1 is preferably configured to transfer a vertical load between the left wing section 310-1 and the center section 330. The right wing section 310-2 is preferably pivotally coupled to the center section 330 (either directly or via intermediate structure) for relative motion about a substantially horizontal axis parallel to the planting direction. A right wing flex actuator 312-2 (preferably a dual-acting hydraulic cylinder) is preferably pivotally coupled to the right wing section 310-2 and the center section 330. The right wing flex actuator 312-2 is preferably configured to transfer a vertical load between the right wing section 310-2 and the center section 330.

In some embodiments the planter 300 comprises one of the embodiments disclosed in International Patent Application No. PCT/US2012/040756 or International Patent Application No. PCT/US2013/023287 ("the '287 Application"), both of which are hereby incorporated by reference herein.

Figure 5:
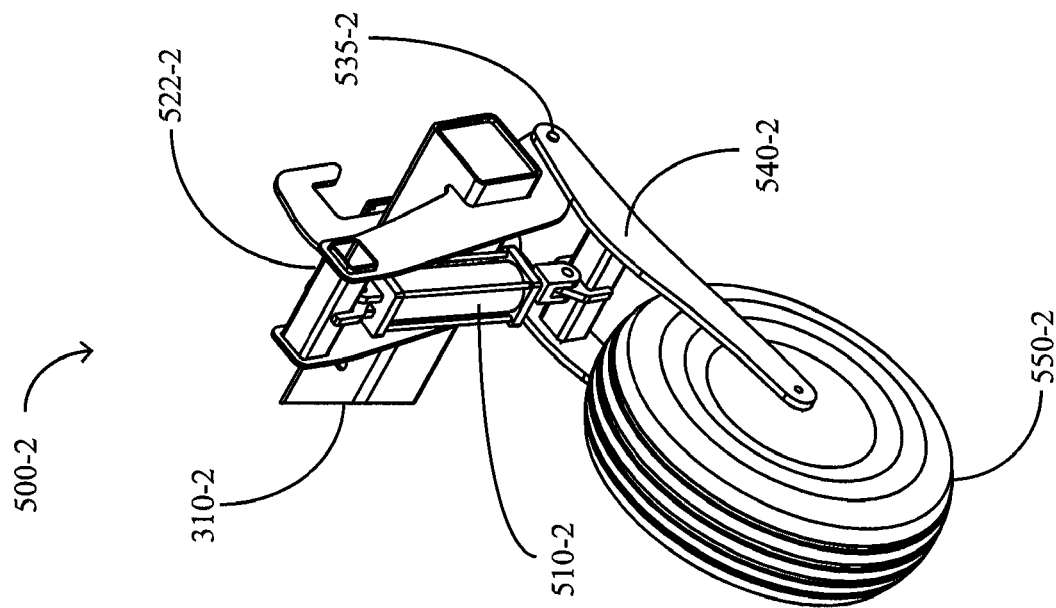
FIG. 5 is a rear perspective view of a wing wheel assembly of the planter of FIG. 1.

Each wing section 310 preferably includes a wing wheel assembly 500 mounted to a distal end thereof. Each wing wheel assembly 500 is preferably configured to rollingly support the wing section 310 as the planter 300 traverses the field. Referring to FIG. 5, the wing wheel assembly 500 preferably includes a mounting bar 522 mounted to the wing section 310 above and behind a distal end of the wing section. A wing wheel frame 540 is pivotally mounted to the wing section 310 by one or more transversely extending pins 535. A wing wheel 550 is rollingly mounted to a rearward end of the wing wheel frame 540. An actuator 510 is pivotally mounted at a first end to the mounting bar 522 and pivotally mounted at a second end to wing wheel frame 540 for raising and lowering of the wing section 310. The actuator 510 is preferably a dual-acting hydraulic cylinder.

Figure 4:
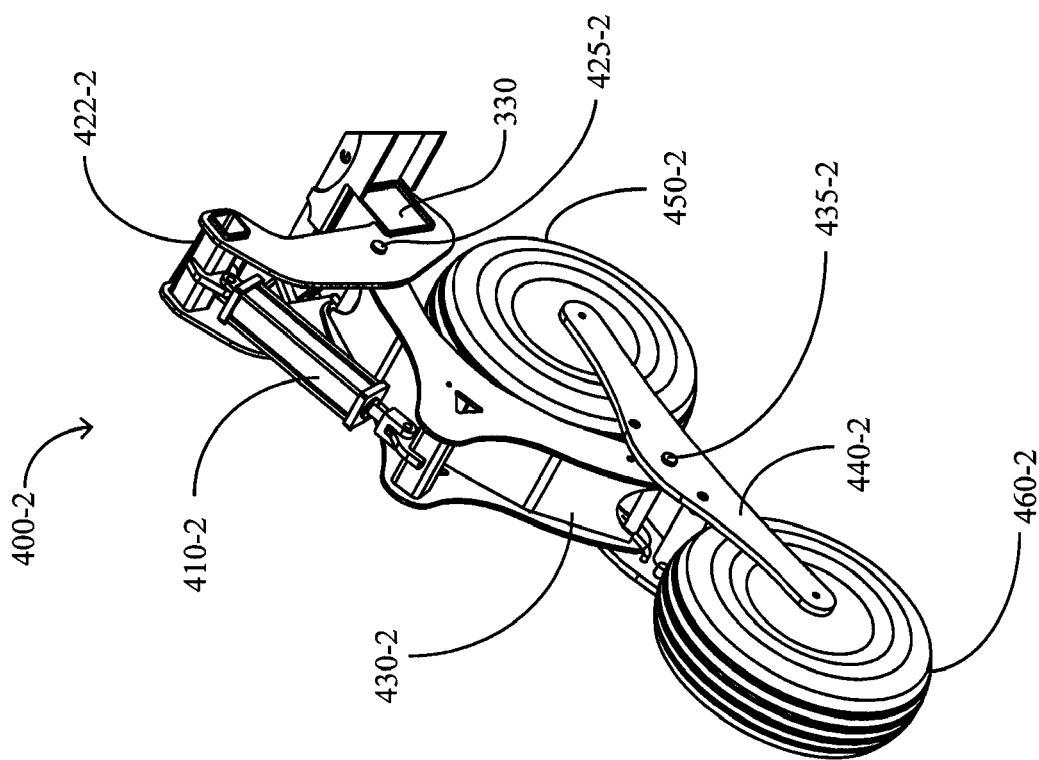
FIG. 4 is a rear perspective view of a center wheel assembly of the planter of FIG. 1.

The center section 330 preferably includes a plurality of center wheel assemblies 400. Each center wheel assembly 400 is preferably configured to rollingly support the center section 330 as the planter 300 traverses the field. Referring to FIG. 4, the wing wheel assembly 400 preferably includes a mounting bar 422 mounted to the center section 330 and positioned above the center section 330. A center wheel frame 430 is pivotally mounted to the center section 330 by a transversely extending pin 425. A center wheel actuator 410 is pivotally mounted at a first end to the mounting bar 422 and pivotally mounted at a second end to the center wheel frame 430 for selective raising and lowering of the toolbar. A wheel frame 440 is pivotally mounted to the center wheel frame 430 about a transverse pin 435. A forward wheel 450 is rollingly mounted to a forward end of the wheel frame 440. A rear wheel 460 is rollingly mounted to a rearward end of the wheel frame 440. In operation, the center wheel assembly 400 rollingly supports the weight of the toolbar and the wheel frame 440 pivots to allow the forward and rear wheels 450, 460 to move up and down relative to one another as the center wheel assembly encounters obstructions or uneven terrain.

Figure 2:
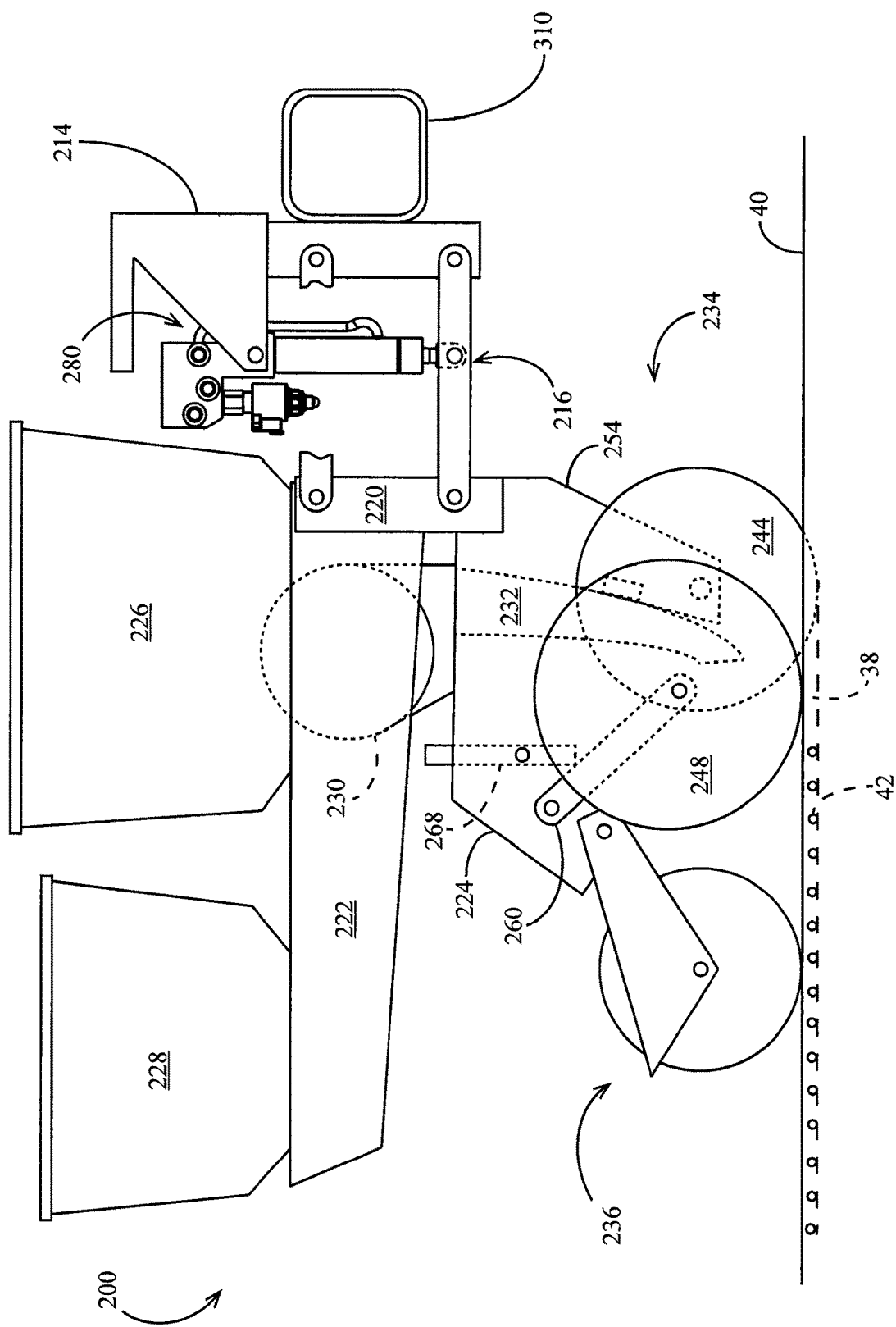
FIG. 2 is a side elevation view of a row unit of the planter of FIG. 1.

Turning to FIG. 2, one of the row units 200 of the planter 300 is illustrated in more detail. A parallel linkage 216 supports the row unit 200 from the one of the toolbar sections 310, permitting each row unit to move vertically independently of the toolbar and the other spaced row units in order to accommodate changes in terrain or upon the row unit encountering a rock or other obstruction as the planter is drawn through the field. Each row unit 200 further includes a mounting bracket 220 to which is mounted a hopper support beam 222 and a subframe 224. The hopper support beam 222 preferably supports a seed hopper 226 and a fertilizer hopper 228. The row unit 200 preferably includes seed meter 230 disposed to receive and meter seeds from the seed hopper 226 into a seed tube 232 (or seed conveyor) disposed to guide seeds from the seed meter to the soil. The subframe 224 preferably operably supports a furrow opening assembly 234 and a furrow closing assembly 236.

Each row unit 200 preferably includes a downforce actuator 280 (preferably a dual-acting hydraulic actuator) disposed to transmit vertical loads between the toolbar section 310 and the row unit 200. The downforce actuator 280 preferably comprises one of the downforce actuator embodiments disclosed in International Patent Application No. PCT/US2012/049747 ("the '747 Application"), incorporated herein by reference. The downforce actuator 280 is preferably pivotally mounted at an upper pivot point to a mounting bracket 214; the mounting bracket 214 is preferably rigidly mounted to the toolbar section 310. The downforce actuator 280 is preferably pivotally mounted at a lower end to the parallel linkage 216.

The furrow opening assembly 234 preferably includes a pair of furrow opening disk blades 244 and a pair of gauge wheels 248 selectively vertically adjustable relative to the disk blades 244 by a depth adjusting mechanism 268. The disk blades 244 are rotatably supported on a shank 254 depending from the subframe 224. Gauge wheel arms 260 pivotally support the gauge wheels 248 from the subframe 224. The gauge wheels 248 are rotatably mounted to the forwardly extending gauge wheel arms 260.

In operation of the row unit 200, the furrow opening assembly 234 cuts a furrow 38 into the soil surface 40 as the planter 300 is drawn through the field. The seed hopper 226, which holds the seeds to be planted, communicates a constant supply of seeds 42 to the seed meter 230. The seed 42 drops from the end of the seed tube 232 into the furrow 38 and the seeds 42 are covered with soil by the closing wheel assembly 236.

Control System Embodiments

Figure 6:
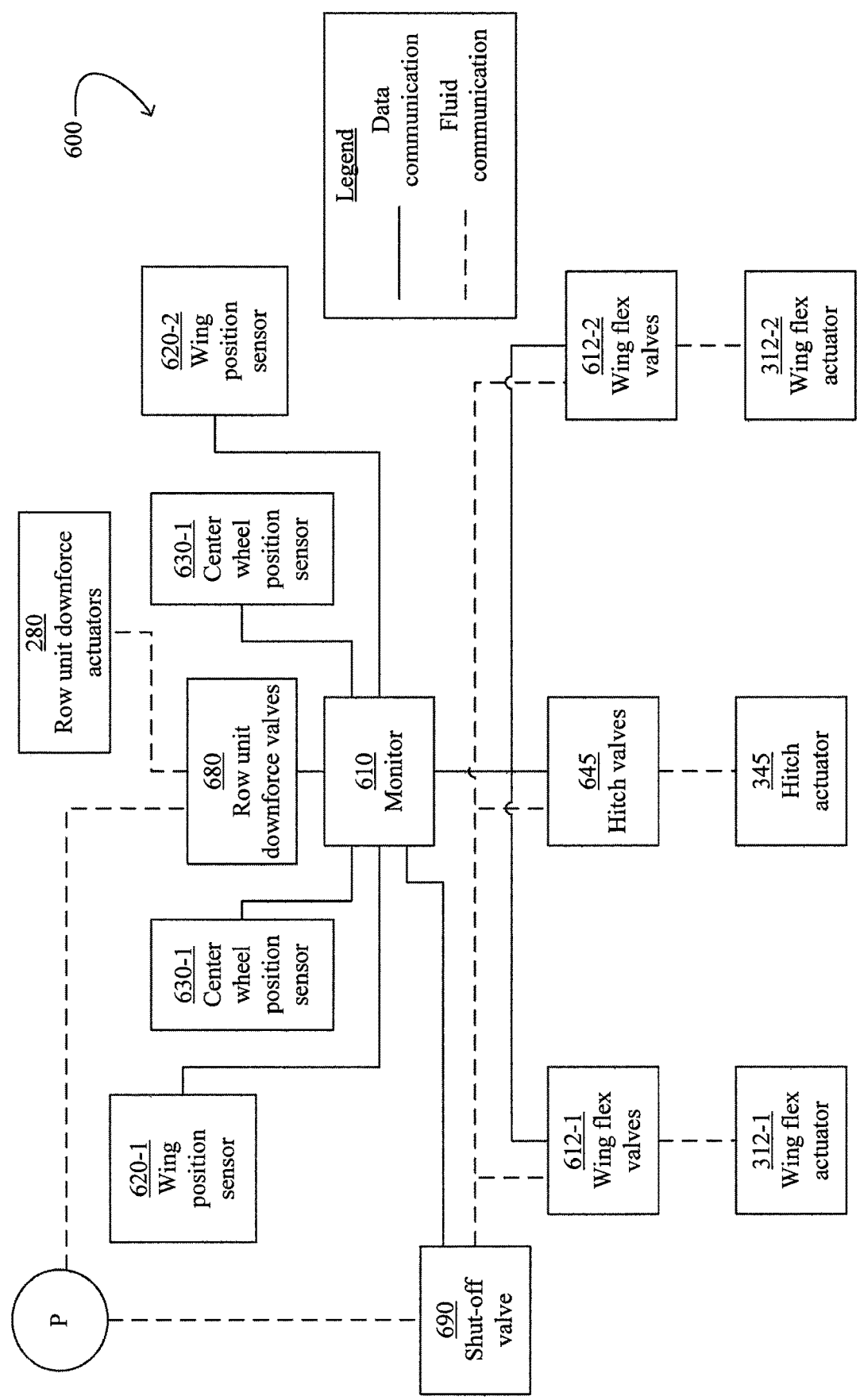
FIG. 6 schematically illustrates an embodiment of a weight transfer control system.

Turning to FIG. 6, a control system 600 for controlling downforce (i.e., weight transfer) functions in the planter 300 is illustrated schematically.

In the control system 600, a pressure source P (e.g., a tractor hydraulic pressure outlet) is preferably in fluid communication with each of the valves described below. A shut-off valve 690 (preferably an electro-hydraulic on-off valve) is preferably in series fluid communication with both the pressure source P and all or a subset of the valves described below in order to selectively stop fluid flow and pressure supply to the valves.

The control system 600 preferably includes a monitor 610 having a central processing unit ("CPU"), a memory, and a graphical user interface ("GUI") allowing the user to view and enter data into the monitor. The monitor 610 is preferably configured to perform the same functions as the planter monitor embodiments disclosed in U.S. patent application Ser. No. 13/292,384, now U.S. Pat. No. 8,386,137, the disclosure of which is hereby incorporated herein in its entirety by reference, such that the monitor is capable of displaying downforce and seeding information to the user. The monitor 610 is preferably mounted in a cab 7 of the tractor 5 (see FIG. 1) for viewing and use by the operator. In some embodiments, the monitor 610 may additionally encompass a CPU and memory stored outside the tractor cab (e.g., on the planter 300).

The monitor 610 is preferably in data communication with a plurality of row unit downforce valves 680, enabling the monitor 610 to send a pressure command signal to each row unit downforce valve. The row unit downforce valves 680 are preferably electro-hydraulic pressure control valves (e.g., pressure reducing/relieving valves) configured to control an outlet pressure in "pressure control", e.g., to maintain a selected control pressure at an outlet of the valve. A row unit downforce valve 680 is preferably in fluid communication with one chamber of each row unit downforce actuator 680. In some embodiments a row unit downforce valve 680 is in fluid communication with the counter-acting chamber of all or a subset of counter-acting chambers as disclosed in the '747 Application, previously incorporated by reference. The row unit downforce valves are thus enabled to cause each row unit downforce actuator to impose a selected net force (e.g., down force or lift force) on the row unit 200 associated with the row unit downforce actuator.

The monitor 610 is preferably in data communication with left wing flex valve 612-1 and right wing flex valves 612-2, enabling the monitor to send a pressure command signal to each wing flex valve. The wing flex valves 612 are preferably electro-hydraulic pressure reducing/relieving valves configured to control an outlet pressure in "pressure control", e.g., to maintain a selected control pressure at an outlet of the valve. A first left wing flex valve 612-1 is preferably in fluid communication with a first chamber of the left wing flex actuator 312-1. A second left wing flex valve 612-1 is preferably in fluid communication with a second, counter-acting chamber of the left wing flex actuator 312-1. A first right wing flex valve 612-2 is preferably in fluid communication with a first chamber of the right wing flex actuator 312-2. A second right wing flex valve 612-2 is preferably in fluid communication with a second, counter-acting chamber of the right wing flex actuator 312-2. Each pair of wing flex valves 612 is thus enabled to cause the associated wing flex actuator 312 to impose a selected net force (e.g., down force or lift force) on the wing section 130 associated with the pair of wing flex valves.

The monitor 610 is preferably in data communication with first and second hitch flex valves 645. The hitch valves 645 are preferably electro-hydraulic pressure control valves (e.g., pressure reducing/relieving valves) configured to control an outlet pressure in "pressure control", e.g., to maintain a selected control pressure at an outlet of the valve. The first hitch valve 645 is preferably in fluid communication with a first chamber of the hitch actuator 345. A second hitch valve 645 is preferably in fluid communication with a second, counter-acting chamber of the hitch actuator. The hitch valves 645 are thus enabled to cause the hitch actuator 345 to impose a selected net force (e.g., down force or lift force) on the toolbar of the planter 300.

The monitor 610 is preferably in data communication with a left wing position sensor 620-1 associated with the left wing section 310-1 and a right wing position sensor 620-2 associated with the right wing section 310-2. Each wing position sensor 620 is preferably configured to generate a signal related to a position of the associated wing section 310. Specifically, each wing position sensor 620 preferably generates a signal which increases or decreases as the associated wing section 310 rises relative to the ground surface in contact with the wing wheel 550.

Figure 7A:
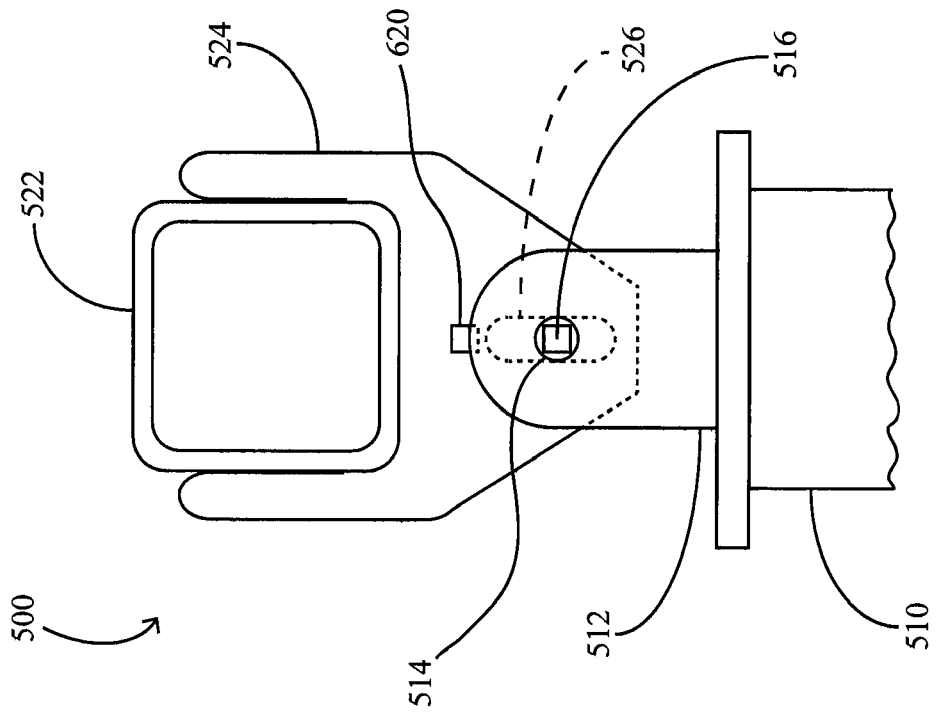
FIG. 7A is a side elevation view of an embodiment of a wing position sensor.
Figure 7B:
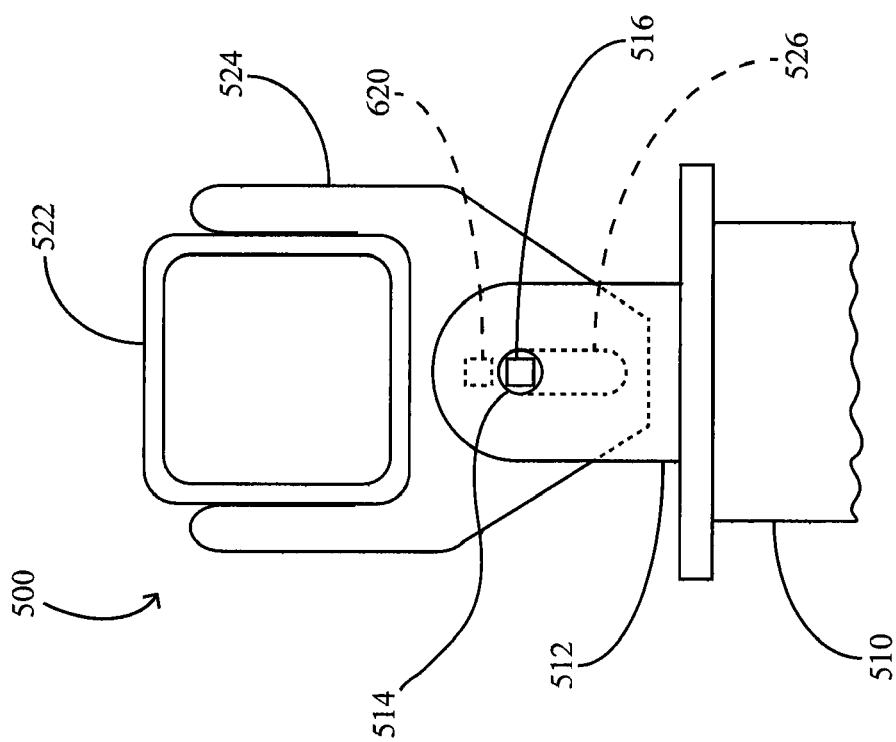
FIG. 7B is a side elevation view of the wing position sensor of FIG. 7A in another position.

Referring to the embodiment of FIGS. 7A and 7B, each wing position sensor 620 preferably comprises a Hall-effect sensor configured to generate a signal related to its distance from a magnet 516. In the illustrated embodiment, the wing position sensor 620 is mounted to a tang 524, the tang being rigidly mounted to the mounting bar 522. A vertical slot 526 in the tang 524 slidingly engages a pin 514. The pin 514 is mounted to a clevis 512, the clevis being mounted to an upper end of the actuator 510 of the wing wheel assembly 500. The magnet 516 is mounted to the pin 514. As best illustrated with reference to FIG. 7A and FIG. 5, when the wing section 310 is fully lowered, the pin 514 is in contact with an upper end of the slot 526 such that the magnet 514 is adjacent to the sensor 620, causing the sensor 620 to generate a "wing lowered" signal. When the wing section 310 rises relative to the wing wheel assembly 500 (e.g., when the right wing section 310 rotates upward with respect to the center section 330) as illustrated in FIG. 7B, the pin 516 slides downward within the slot 526 and away from the sensor 620, thus causing the sensor 620 to generate a "wing raised" signal distinguishable from the "wing lowered" signal.

Returning to FIG. 6, the monitor 610 is preferably in data communication with a left center wheel position sensor 630-1 associated with the left center wheel assembly 400-1 and a right center wheel position sensor 630-2 associated with the right center wheel assembly 400-2. Each center wheel position sensor 630 is preferably configured to generate a signal related to a position of the associated center wheel assembly and thus of the center section 330. Specifically, each center wheel position sensor 630 preferably generates a signal which increases as the associated center wheel assembly lowers relative to the center section 330 (e.g., as the center section 330 rises relative to the ground surface).

Figure 10B:
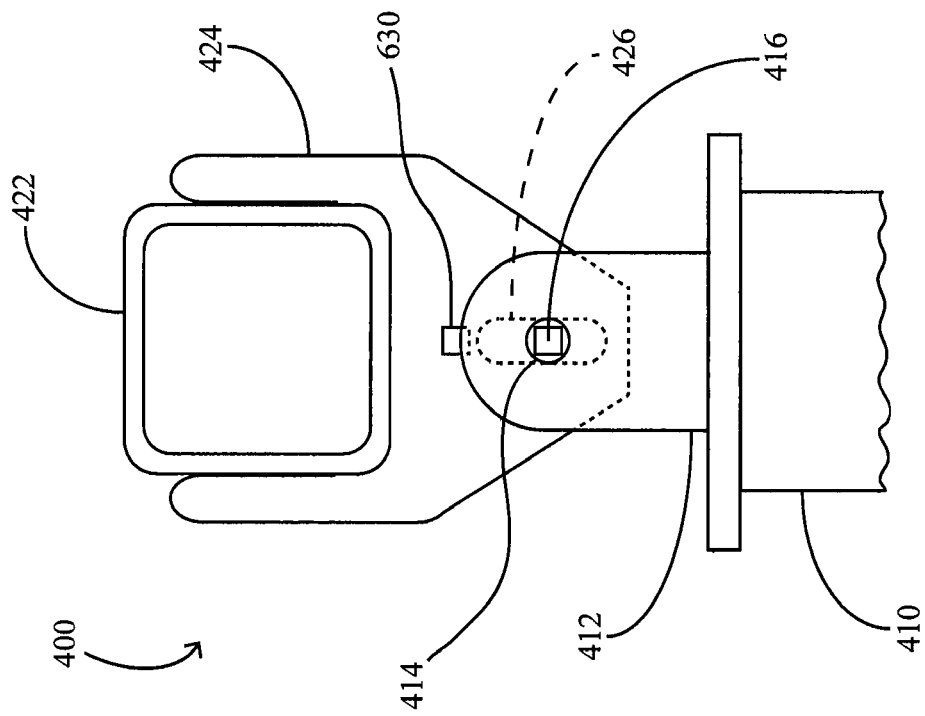
FIG. 10B is a side elevation view of the center wheel position sensor of FIG. 10A in a second position.
Figure 10A:
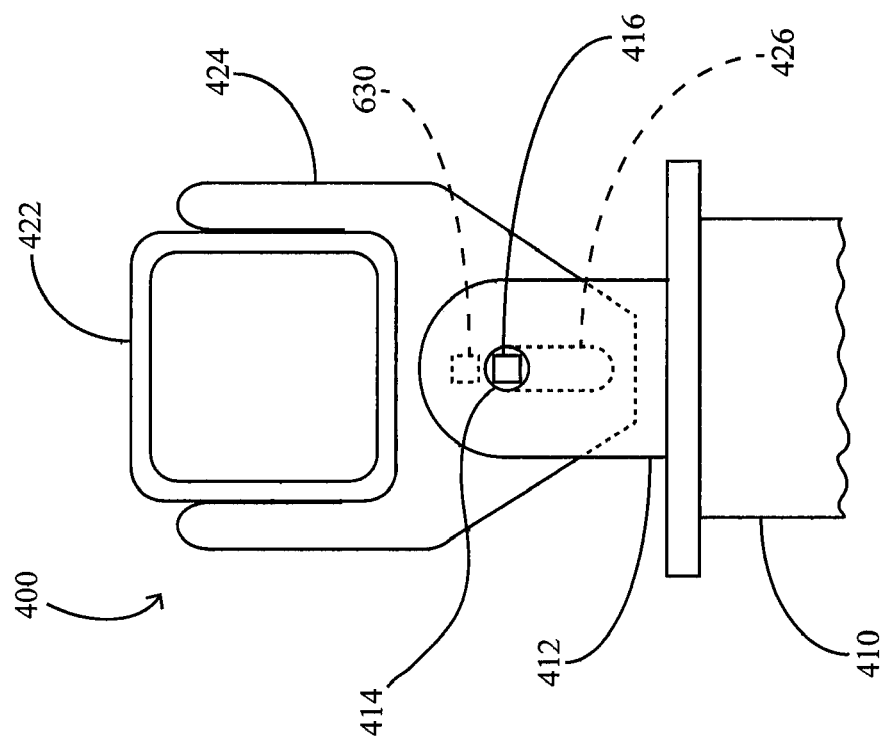
FIG. 10A is a side elevation view of an embodiment of a center wheel position sensor.

Referring to the embodiment of FIGS. 10A and 10B, each center wheel position sensor 630 preferably comprises a Hall-effect sensor configured to generate a signal related to its distance from a magnet 416. In the illustrated embodiment, the center wheel position sensor 630 is mounted to a tang 424, the tang being rigidly mounted to the mounting bar 422. A vertical slot 426 in the tang 424 slidingly engages a pin 414. The pin 414 is mounted to a clevis 412, the clevis being mounted to an upper end of the actuator 410 of the center wheel assembly 400. The magnet 416 is mounted to the pin 414. As best illustrated with reference to FIG. 10A and FIG. 4, when the center section 330 is fully lowered, the pin 414 is in contact with an upper end of the slot 426 such that the magnet 414 is adjacent to the sensor 630, causing the sensor 630 to generate a first "center lowered" signal. When the center section 330 rises relative to the center wheel assembly 400 as illustrated in FIG. 10B, the pin 416 slides downward within the slot 426 and away from the sensor 630, thus causing the sensor 630 to generate a second signal distinguishable from the "center lowered" signal.

In operation of the control system 600, the pressure source P supplies pressure to each of the actuators via the associated valves. The monitor 610 is preferably in data communication with the shut-off valve 690 such that the monitor may send command signals causing the shut-off valve 690 to close or open. In the illustrated embodiment, closing the shut-off valve 690 cuts off fluid flow to only a subset of the valves, specifically the wing flex valves 612 and the hitch valve 645. Thus in the illustrated embodiment the monitor 610 is enabled to cut off pressure supply to the hitch valves 645 and the wing flex valves 612 without cutting off pressure to the row unit downforce valves 680. In other embodiments, first and second shut-off valves (preferably in data communication with the monitor 610) may be placed in series fluid communication with the wing flex valves 612 and the hitch valves 645 to enable individually selective deactivation of the wing flex valves 612 or the hitch valves 645.

Weight Transfer Methods

Figure 8:
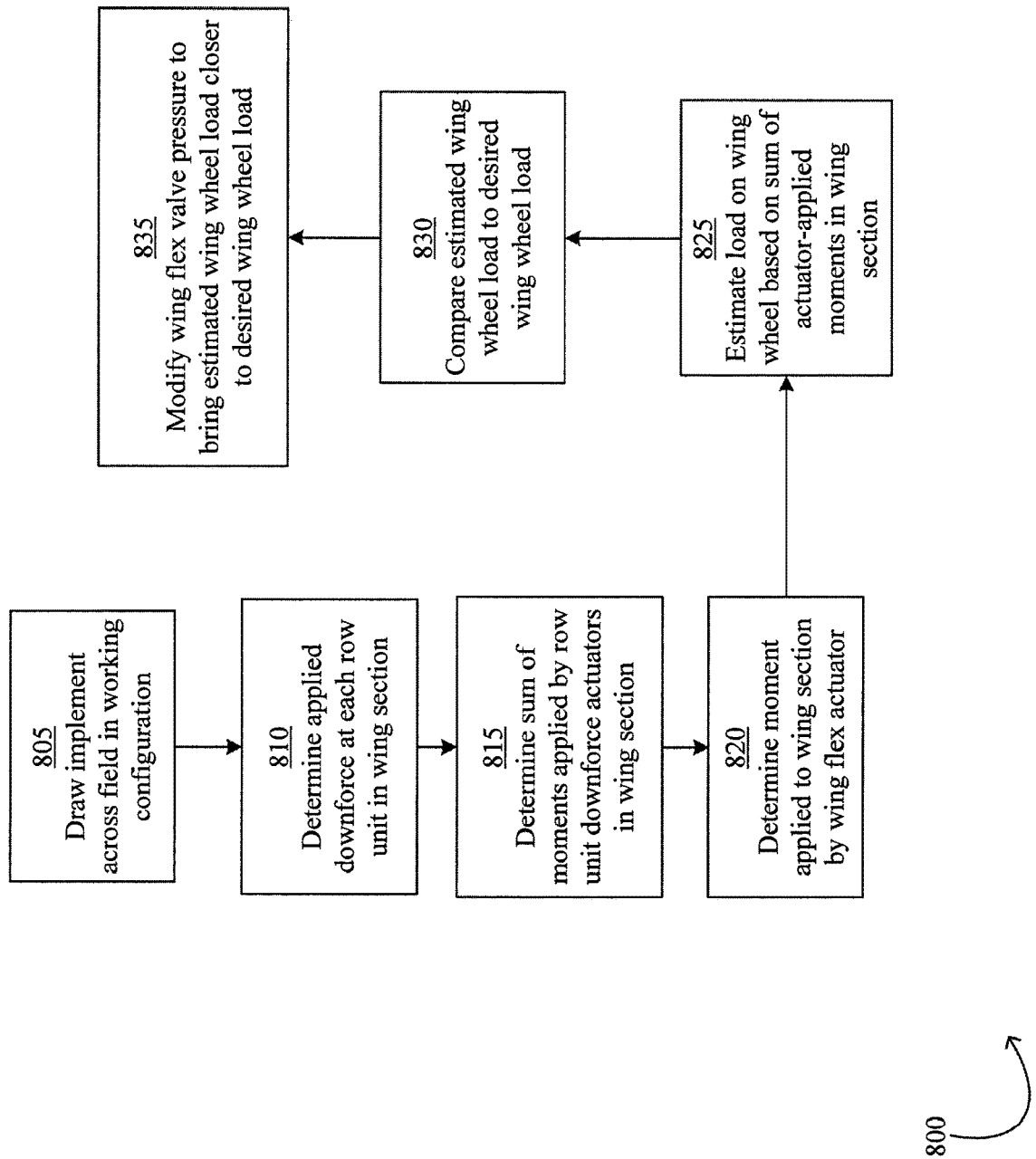
FIG. 8 illustrates an embodiment of a weight transfer process.

The monitor 610 is preferably configured to perform a wing flex weight transfer process 800 illustrated in FIG. 8. The process 800 generally controls the pressure in one of the wing flex actuators 312 based in part on the downforce applied by downforce actuators 280 to the row units 200 on the toolbar section 310 associated with the wing flex actuator. At step 805 the operator preferably draws the planter 300 across a field in the working configuration illustrated in FIG. 3. At step 810, the monitor 610 preferably determines the downforce applied at each row unit 200. In a preferred embodiment, step 810 is accomplished by determining the net pressure $P_R$ being commanded by the monitor 610 to each row unit downforce actuator valve 680 associated with a downforce actuator 280 on (e.g., mounted to) the wing section 310 associated with the wing flex actuator 312. In other embodiments step 810 is accomplished by obtaining a signal from a pressure sensor or force sensor configured to measure pressure or force, respectively, acting on each actuator 280 associated with the wing section 310. At step 815, the monitor 610 preferably determines a sum $M_R$ of the moments applied by the actuators 280 to the wing section 310, e.g., using the relation:

$$M_R = \Sigma D_N k_N P_{R,N}$$

Where: $D_N$=Horizontal distance from wing section flex joint and actuator 280 of Nth row unit;
$P_{R,N}$=Pressure in actuator 280 of the Nth row unit; and
$k_N$=Empirical ratio between vertical force applied by actuator 280 and $P_R$.

At step 820, the monitor 610 preferably determines the moment $M_A$ applied by the wing flex actuator 312 to the wing section 310, e.g., using the relation:

$$M_A = k_A P_A$$

Where: $P_A$=Pressure in actuator 312; and
$k_A$=Empirical ratio between moment applied by actuator 312 and $P_A$.

At step 825 the monitor 610 preferably estimates the vertical ground surface load $F_W$ acting on the wing wheel 550, e.g., using the relation:

$$F_W = \frac{(W_W)(D_C) + M_A - M_R}{D_W}$$

Where: $D_W$=Horizontal distance between wing flex joint and wing wheel soil contact location;
$W_w$=Weight of the wing section (including the toolbar section itself and any loads carried thereby, e.g., liquid tanks); and
$D_C$=Horizontal distance between wing flex joint and center of gravity of wing section.

At step 830, the monitor 610 preferably compares the estimated wing wheel load $F_W$ to a desired wing wheel load $F_{W,D}$. In some embodiments, the desired wing wheel load may be a constant preselected value, which may be preloaded in the memory of the monitor 610. In other embodiments, the desired wing wheel load may be a fraction of the total load (measured or estimated) on the center wheels 450, 460. In some embodiments, the desired wing wheel load may be determined according to the methods described in the '287 Application, previously incorporated by reference.

At step 835, the monitor 610 preferably modifies the control pressure of one or both of the wing flex valves 612 in order to bring the estimated wing wheel load $F_W$ closer to the desired wing wheel load $F_D$. For example, if the wing flex valve 612 associated with the lift chamber of the wing flex actuator 312 is commanding a first lift pressure and $F_W$ is less than $F_D$, then the wing flex valve 612 preferably decreases the control pressure supplied to the wing flex valve 312 associated with the lift chamber. The amount of modification to the control pressure of the wing flex valve 612 is preferably determined using PID control algorithms as are known in the art.

It should be appreciated that the performance of process 800 is not dependent on the wing wheel load estimates being the same as the actual load on the wing wheels. Rather, if another value is calculated that is directly or indirectly related to the wing wheel load, such value may be likewise used to carry out the process 800.

Figure 12:
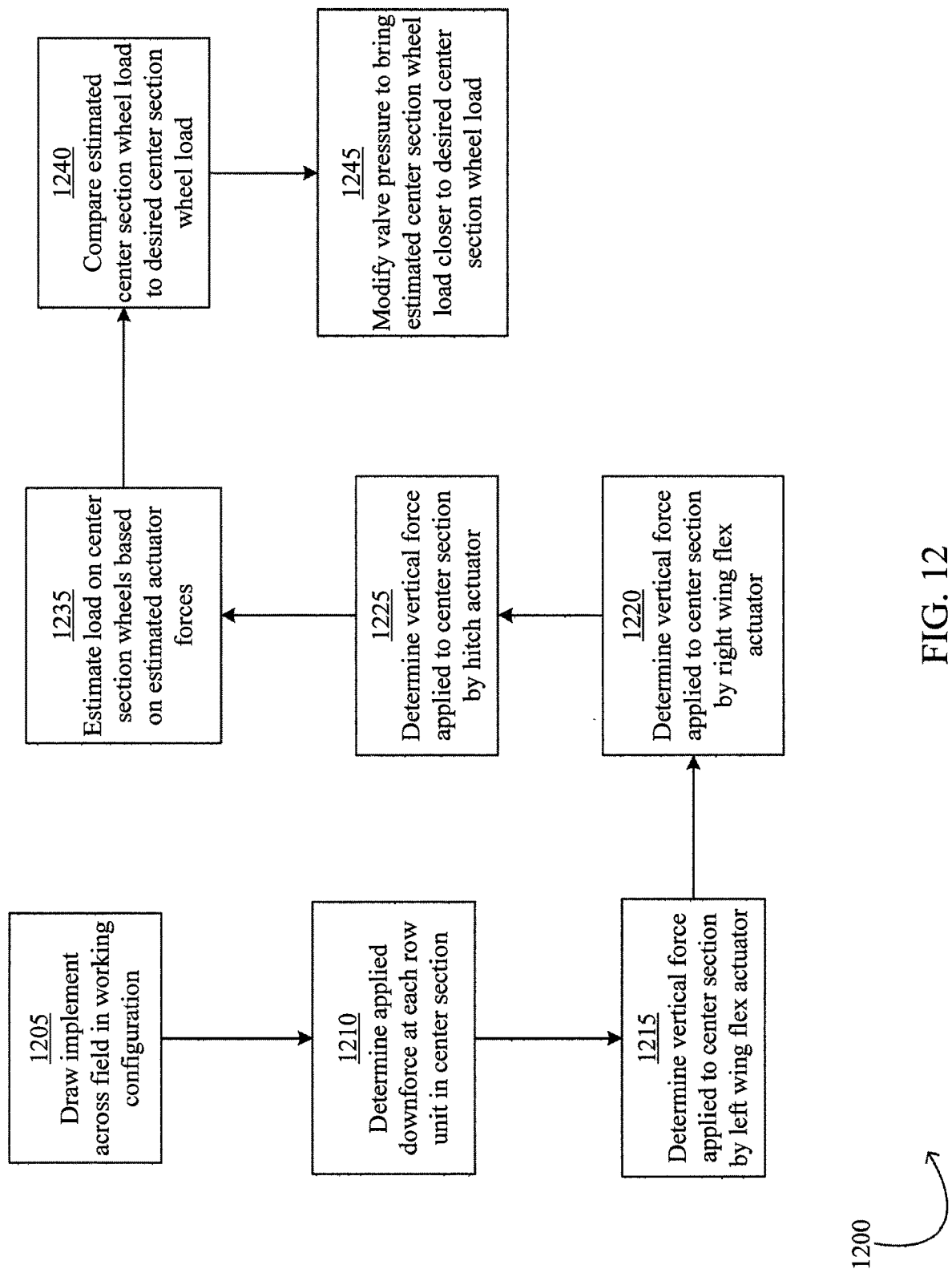
FIG. 12 illustrates another embodiment of a weight transfer process.

The monitor 610 is preferably configured to perform a wing flex weight transfer process 1200 illustrated in FIG. 12. The process 1200 generally controls the pressure in one or more of the actuators 312, 345 based in part on the downforce applied by downforce actuators 312, 345, 280 to the toolbar center section 330. At step 1205 the operator preferably draws the planter 300 across a field in the working configuration illustrated in FIG. 3. At step 1210, the monitor 610 preferably determines the downforce $F_R$ applied at each row unit 200. In a preferred embodiment, step 1210 is accomplished by determining the net pressure $P_R$ being commanded by the monitor 610 to each row unit downforce valve 680 associated with an actuator 280 on (e.g., mounted to) the center section 330 and multiplying each value of $P_R$ by an empirical ratio between $P_R$ and $F_R$. In other embodiments step 1210 is accomplished by obtaining a signal from a pressure sensor or force sensor configured to measure pressure or force, respectively, acting on each actuator 280 associated with the center section 330. At steps 1215 and 1220, the monitor 610 preferably determines the vertical forces $F_{W1}$, $F_{W2}$ applied to the center section 330 by the wing flex actuators 312-1, 312-2, respectively, e.g., by multiplying the net pressure in each wing flex actuator by an empirical ratio between net pressure in each wing flex actuator and the resulting vertical force applied to the center section. At step 1225, the monitor 610 preferably determines the vertical force $F_H$ applied to the center section 330 by the hitch actuators 345, e.g., by multiplying the net pressure in the hitch actuator by an empirical ratio between net pressure in the hitch actuator and the resulting vertical force applied to the center section.

At step 1235, the monitor 610 preferably estimates the total load $F_C$ on the center wheels 450, 460, e.g., using the relation:

$$F_C = W - F_H - \Sigma F_R - F_{W1} - F_{W2}$$

Where: W is an estimate of the weight of the center section 330.

In some embodiments the value of W is a constant value stored in memory. However, it should be appreciated that in many implements, the center section supports one or more crop input containers such as seed hoppers or bulk tanks which change in weight as the crop input is applied in the field. Thus in a preferred embodiment the value of W is determined by adding a center section weight with an empty crop input container (e.g., bulk seed hopper) to the weight of seed in the container determined using a sensor or combination of sensors used to weigh the container. In some embodiments the sensor comprises an array of load cells or scales as disclosed in U.S. patent application Ser. No. 12/855,173 (pub. no. 2012/003691), incorporated herein by reference. Similar systems and methods may be used to determine a "live" weight of the wing section $W_W$ in process 800.

At step 1240, the monitor 610 preferably compares the estimated total load $F_C$ on the center wheels to a desired total center wheel load $F_{C,D}$. In some embodiments, the desired total center wheel load may be a constant preselected value, which may be preloaded in the memory of the monitor 610. In other embodiments, the desired wing wheel load may be a fraction of a load (measured or estimated) on the wheels or a subset of the wheels (e.g., the rear wheels) of the tractor drawing the planter 300. In some embodiments, the desired center wheel load and recommended modifications to the actuator pressures may be determined according to the methods described in the '287 Application, previously incorporated by reference.

At step 1235, the monitor 610 preferably modifies the control pressure of one or more of the valves 612, 645 in order to bring the estimated center wheel load $F_C$ closer to the desired wing wheel load $F_{C,D}$. In some embodiments, if the wing flex valves 612-1, 612-2 associated with the lift chamber of the wing flex actuators 312 are commanding first and second lift pressures and $F_C$ is less than $F_{C,D}$, then the wing flex valves 612-1, 612-2 preferably decreases the control pressure supplied to lift chambers of the wing flex actuators 312. In other embodiments, if the hitch valves 645 are commanding a net lift pressure and $F_C$ is less than $F_{C,D}$, then one of the hitch valves 645 preferably decreases the control pressure supplied to the to the lift chamber of the hitch actuator 345. In still other embodiments an operating state of both the hitch valves 645 and wing flex valves 612 is modified in order to bring $F_C$ closer to $F_{C,D}$; for example, if $F_C$ is greater than $F_{C,D}$ then both wing flex lift pressures and the hitch lift pressure are preferably reduced. The amount of modification to the control pressure of the valves 612, 645 is preferably determined using PID control algorithms as are known in the art.

It should be appreciated that the performance of process 1200 is not dependent on the center wheel load estimates being the same as the actual load on the center wheels. Rather, if another value is calculated that is directly or indirectly related to the center wheel load, such value may be likewise used to carry out the process 1200.

Figure 13:
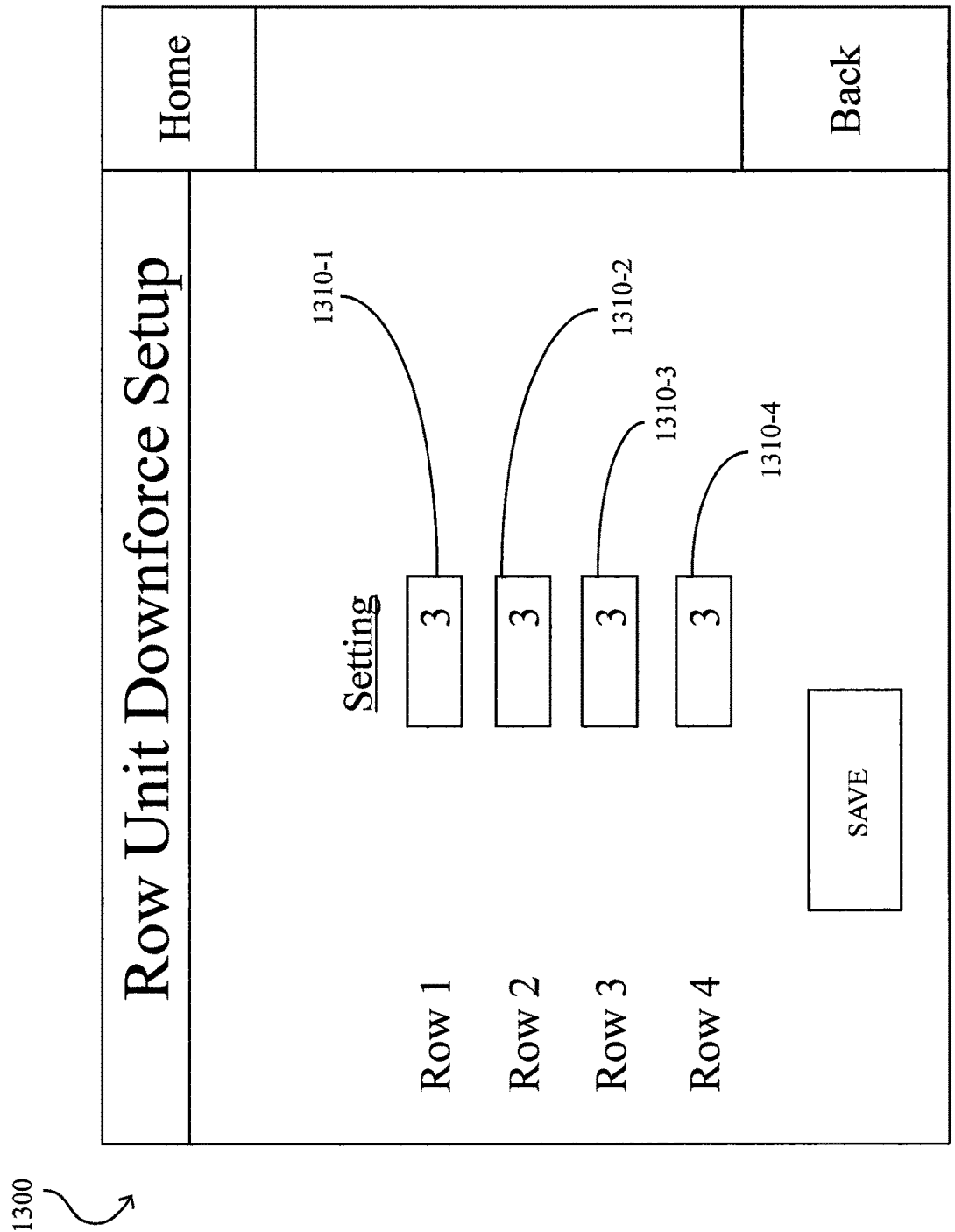
FIG. 13 illustrates an embodiment of a spring force entry screen.
Figure 14:
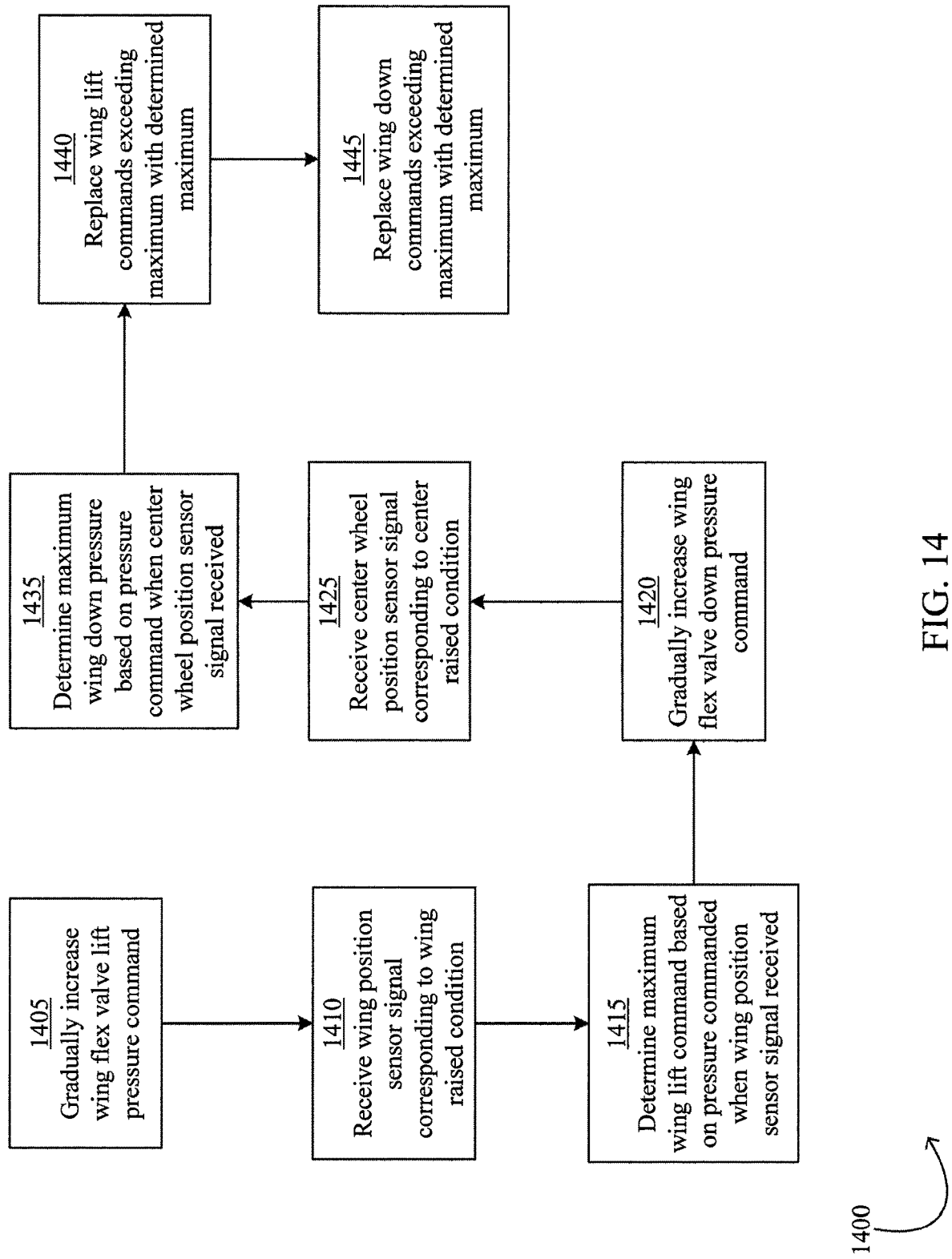
FIG. 14 illustrates an embodiment of a weight transfer system calibration process

In some embodiments of the processes 800 and 1200 described above, the downforce applied at each row unit is determined using the pressure commanded to the row unit downforce actuators 280. However, in some embodiments of the planter 300 another downforce apparatus such as an adjustable spring is used in place of each row unit downforce actuator 280; in such embodiments the monitor 610 is preferably configured to calculate a row unit downforce based on a setting indicator preferably entered by the user and stored in memory of the monitor. For example, turning to FIG. 13, in embodiments using an adjustable spring having multiple settings (i.e., multiple notches in which the spring is extended to various tensions as is known in the art), the monitor 610 preferably displays a screen 1300 allowing the user to enter the spring setting into a field 1310 associated with each row unit 200. In carrying out the processes 800, 1200, the monitor 610 preferably determines downforce on each row unit using an empirical ratio stored in memory which relates the row unit spring setting entered in screen 1300 to an estimated downforce on the row unit.

The monitor 610 is preferably configured to shut off one or more of the weight transfer actuators 312, 345 in response to a signal received from one or both of the wing position sensors 620. One such process 900 is illustrated in FIG. 9. At step 905, the operator preferably draws the planter 300 across the field in the working configuration illustrated in FIG. 3. The monitor 610 preferably determines (e.g., based on user input) that the planter is in a working configuration such that the remainder of the process 900 is carried out. At step 907, the monitor 610 preferably commands pressures to the left wing flex valve 612-1 and the left wing flex valve 612-2. At step 910, the monitor 610 monitors the signal generated by the left wing position sensor 620-1. At step 915, the monitor 610 monitors the signal generated by the right wing position sensor 620-2. At step 920, the monitor 610 compares the left wing position sensor signal to the "wing lowered" value. In each comparison of a position sensor signal described herein, the "lowered" value may comprise a signal level corresponding to a "lowered" position or a threshold value distinguishable from the "lowered" value, e.g., 110% of the signal level corresponding to the "lowered" position. At step 925, the monitor 610 compares the right wing position sensor signal to the "wing lowered" value. At step 930, the monitor 610 identifies a "wing raised" condition based on one of the left or right position sensor signals exceeding the "wing lowered" value.

In response to the identification of the "wing raised" condition at step 930, at step 935 the monitor 610 preferably reduces the pressure supplied to the lift chamber of the actuator 312 (of the wing section 310 in the "wing raised" condition) by reducing the control pressure commanded to the wing flex valve 612 in fluid communication with the lift chamber. The "lift" chamber, as used herein, refers to the chamber in the wing flex actuator whose increased pressure causes raising of the wing wheel or decreased downpressure on the associated wing wheel. At step 940, the monitor 610 preferably waits a predetermined time (e.g., 3 seconds) and again compares the "wing lowered" value to the signal from the wing position sensor 620 that previously generated a signal corresponding to a "wing raised" condition. If step 940 results in a "wing raised" condition being again identified at step 950, then at step 955 the monitor preferably places both wing flex valves 612 associated with the wing flex actuator 312 (of the wing section 310 in the "wing raised" condition) in a "float mode", i.e., commands an equal (e.g., zero or negligible) pressure to both of the wing flex valves. In some embodiments, at step 955 the monitor also places the hitch valve 645 in a float mode. At step 960, the monitor 610 preferably waits a predetermined time (e.g., 3 seconds) and again compares the "wing lowered" value to the signal from the wing position sensor 620 that previously generated a signal corresponding to a "wing raised" condition. If step 960 results in a "wing raised" condition being again identified at step 965, then at step 970 the monitor preferably closes the shut-off valve 690 in order to stop pressurized fluid flow to the wing flex valves 612 (and in some embodiments to the hitch valves 645).

Figure 11:
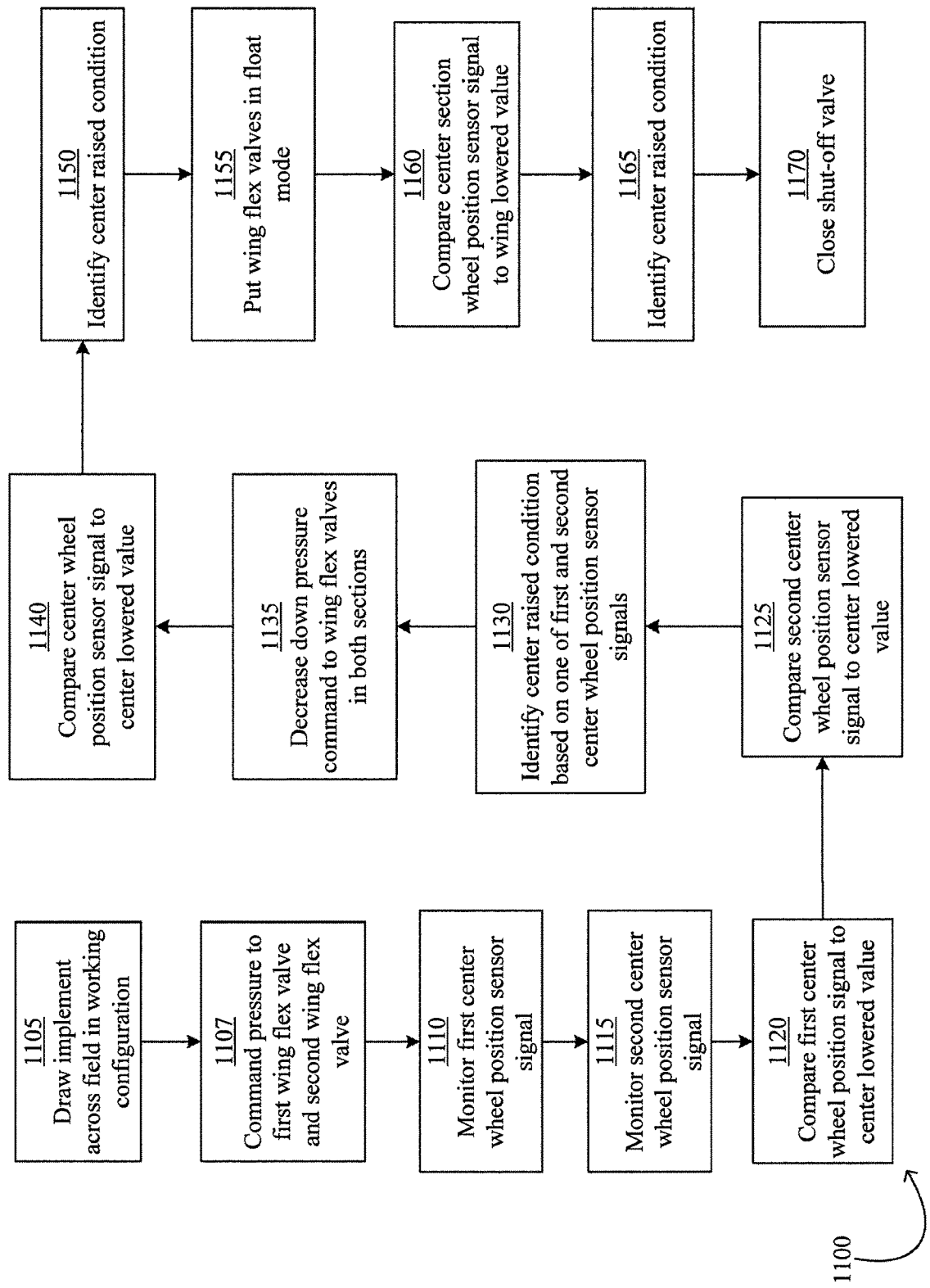
FIG. 11 illustrates another embodiment of a weight transfer shutoff process.

The monitor 610 is preferably configured to shut off one or more of the weight transfer actuators 312, 345 in response to a signal received from one or both of the center wheel position sensors 630. One such process 1100 is illustrated in FIG. 11. At step 1105, the operator preferably draws the planter 300 across the field in the working configuration illustrated in FIG. 3. The monitor 610 preferably determines (e.g., based on user input) that the planter is in a working configuration such that the remainder of the process 1100 is carried out. At step 1107, the monitor 610 preferably commands pressures to the left wing flex valve 612-1 and the left wing flex valve 612-2. At step 1110, the monitor 610 monitors the signal generated by the left center wheel position sensor 630-1. At step 1115, the monitor 610 monitors the signal generated by the right center wheel position sensor 630-2. At step 1120, the monitor 610 compares the left center wheel position sensor signal to the "center lowered" value. At step 1125, the monitor 610 compares the right center wheel position sensor signal to the "center lowered" value. At step 1130, the monitor 610 identifies a "center raised" condition based on one of the left or right position sensor signals exceeding the "center lowered" value.

In response to the identification of the "center raised" condition at step 1130, at step 1135 the monitor 610 preferably reduces the pressure supplied to the downpressure chamber of the actuators 312-1, 312-2 (or in some embodiments only the actuator 312 adjacent to the center wheel in the "center raised" condition) by reducing the control pressure commanded to the wing flex valve 612 in fluid communication with the downpressure chamber. The "downpressure" chamber, as used herein, refers to the chamber in the wing flex actuator whose increased pressure causes lowering of the associated wing wheel or increased downpressure on the associated wing wheel. At step 1140, the monitor 610 preferably waits a predetermined time (e.g., 3 seconds) and again compares the "center lowered" value to the signal from the center wheel position sensor 630 that previously generated a signal corresponding to a "center raised" condition. If step 1140 results in a "center raised" condition being again identified at step 1150, then at step 1155 the monitor 610 preferably places both wing flex valves 612 associated with both wing flex actuators 312 in a "float mode", i.e., commands an equal (e.g., zero or negligible) pressure to both of the wing flex valves. In some embodiments, at step 1155 the monitor also places the hitch valves 645 in a float mode. At step 1160, the monitor 610 preferably waits a predetermined time (e.g., 3 seconds) and again compares the "center lowered" value to the signal from the center wheel position sensor 630 that previously generated a signal corresponding to a "center raised" condition. If step 1160 results in a "center raised" condition being again identified at step 1165, then at step 1170 the monitor preferably closes the shut-off valve 690 in order to stop pressurized fluid flow to the wing flex valves 612 (and in some embodiments to the hitch valves 645).

The monitor 610 is preferably configured to perform a calibration process 1400 prior to field operations for determining a maximum actuator pressure based on a position sensor value. At step 1405, the monitor 610 preferably gradually increases the pressure commanded to the wing flex valve 612 in fluid communication with the lift chamber of one of the wing flex actuators 312. At step 1410, the monitor 610 receives a signal corresponding to a "wing raised" condition from the wing position sensor 620 associated with the same wing as the actuator of step 1405. At step 1415, the monitor 610 preferably determines a maximum wing lift command (i.e., the maximum desired command to the wing flex valve of step 1405) based on the pressure commanded to the valve at the time the "wing raised" signal was received. The maximum command may be the same as or a threshold percentage (e.g., 90%) of the command corresponding to the "wing raised" signal. It should be appreciated that steps 1405, 1410, 1415 should be repeated for the wing position sensor and wing actuator associated with the other wing section.

At step 1420, the monitor 610 preferably gradually increases the pressure commanded to the wing flex valve 612 in fluid communication with the downpressure chamber of one of the wing flex actuators 312. At step 1425, the monitor 610 receives a signal corresponding to a "center raised" condition from the center wheel position sensor 630 on the same side of the planter as the actuator of step 1420. At step 1435, the monitor 610 preferably determines a maximum wing downpressure command (i.e., the maximum desired command to the wing flex valve of step 1420) based on the pressure commanded to the valve at the time the "center raised" signal was received. The maximum command may be the same as or a threshold percentage (e.g., 90%) of the command corresponding to the "center raised" signal. It should be appreciated that steps 1420, 1425, 1435 should be repeated for the wing actuator on the other wing section and the center wheel actuator on the same side of the planter as the other wing section. In another embodiment, both wing downpressure commands (i.e., the commands to both downpressure wing flex valves 312) are increased (preferably simultaneously, and preferably such that the same pressure is commanded to both valves) until a "center raised" signal is generated by either of the center wheel position sensors 620-1, 620-2 and the maximum downpressure command is determined based on the downpressure command to the wing flex valves (or one of the valves) at the time of the "center raised" signal.

During a field operation (e.g., planting), at step 1440 the monitor 610 preferably replaces any wing lift pressure commands determined by another process (e.g., the weight transfer processes described herein) and exceeding the maximum pressure determined at step 1420 with the maximum pressure determined at step 1420. At step 1445 the monitor 610 preferably replaces any wing downpressure commands determined by another process (e.g., the weight transfer processes described herein) and exceeding the maximum pressure determined at step 1435 with the maximum pressure determined at step 1435.

In a preferred embodiment, the monitor 610 is configured to perform each of the calibration and weight transfer and calibration processes described herein. In such an embodiment, the monitor 610 carries out the processes 800 and/or 1200 but overrides excessive pressure commands according to the process 1400; moreover, the processes 900 and 1100 are preferably carried out in the case that a "center raised" or "wing raised" condition is identified.

As used herein, "data communication" may refer to any of electrical communication, electronic communication, wireless (e.g., radio, microwave, infrared, sonic, near field, etc.) communication, or communication by any other medium configured to transmit analog signals or digital data.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A weight transfer control system for an agricultural implement, the agricultural implement having a wing section, the wing section having a wing wheel disposed to rollingly support the wing section, the weight transfer control system comprising:
   a wing flex actuator configured to modify downforce applied to the wing section of the implement;
   a wing flex valve in fluid communication with the wing flex actuator;
   a wing position sensor;
   processing circuitry in data communication with the wing position sensor, the processing circuitry configured to determine a position of the wing section; and
   a shut-off valve configured to selectively cut off fluid flow to the wing flex valve.

2. The weight transfer control system of claim 1, wherein the wing position sensor comprises:
   an electromagnetic field generator; and
   an electromagnetic field detector, wherein a distance between the electromagnetic field detector and the electromagnetic field generator changes when the wing section is raised.

3. The weight transfer control system of claim 2, wherein the distance reaches a maximum distance when the wing section is in a raised position.

4. The weight transfer control system of claim 3, further comprising:
   a wing wheel actuator configured to raise and lower the wing wheel;
   a pin mounted to one of the wing section and the wing wheel actuator;
   a slot formed in one of the wing section and the wing wheel actuator; and
   wherein the maximum distance is reached when said pin contacts a limiting edge of the slot.

5. The weight transfer control system of claim 2, wherein the electromagnetic field generator comprises a magnet, and wherein the electromagnetic field detector comprises a Hall-effect sensor.

6. The weight transfer control system of claim 1, further comprising:
   a row unit pivotally mounted to the wing section;
   a row unit downforce actuator disposed to modify a downforce applied to the row unit; and
   a row unit downforce control valve, the row unit downforce control valve in fluid communication with the row unit downforce actuator.

7. The weight transfer control system of claim 6, further comprising:
   a center wheel lift actuator; and
   a center wheel position sensor.

8. The weight transfer control system of claim 1, further comprising:
   a center wheel lift actuator; and
   a center wheel position sensor.

9. The weight transfer control system of claim 1, further comprising:
   a hitch actuator configured to shift weight between the implement and a tractor drawing the implement; and
   a hitch valve configured to select a pressure in the hitch actuator.

10. The weight transfer control system of claim 9, wherein the hitch valve is configured to cause the hitch actuator to impose a net force on the implement.

11. The weight transfer control system of claim 9, wherein the shut-off valve is configured to cut off fluid flow to the hitch valve.

12. The weight transfer control system of claim 6, wherein the row unit downforce control valve is configured to operate independent of the shut-off valve.

13. A method of transferring weight of an agricultural implement, comprising:
  drawing an implement across a field;
  passing a fluid from a wing flex valve to a wing flex actuator to modify a wing downforce applied to a wing section of the implement by the wing flex actuator;
  monitoring a wing section position of the wing section with a wing position sensor; and
  terminating fluid flow to the wing flex valve with a shut-off valve after determining the wing section position to be within a selected range.

14. The method of claim 13, wherein terminating fluid flow to the wing flex valve with a shut-off valve comprises terminating fluid flow after identifying a wing-raised condition.

15. The method of claim 13, wherein passing a fluid from a wing flex valve to a wing flex actuator comprises increasing a downforce applied to the wing section.

16. The method of claim 13, wherein monitoring a wing section position of the wing section comprises detecting a distance between an electromagnetic field generator and an electromagnetic field detector.

17. The method of claim 13, wherein monitoring a wing section position of the wing section comprises detecting a location of a pin within a slot.

18. The method of claim 13, further comprising modifying a downforce applied to a row unit carried by the wing section independent of the wing downforce.

* * * * *